United States Patent [19]
Bensel, III et al.

[11] Patent Number: 5,189,725
[45] Date of Patent: Feb. 23, 1993

[54] OPTICAL FIBER CLOSURE

[75] Inventors: William H. Bensel, III, Lawrenceville; Gary S. Cobb, Norcross, both of Ga.

[73] Assignee: AT&T Bell Laboratories, Murray Hill, N.J.

[21] Appl. No.: 826,711

[22] Filed: Jan. 28, 1992

[51] Int. Cl.⁵ .................................... G02B 6/38
[52] U.S. Cl. ................................ 385/135; 385/136
[58] Field of Search .......................... 385/135, 136

[56] References Cited

U.S. PATENT DOCUMENTS

| | | | |
|---|---|---|---|
| 4,428,645 | 1/1984 | Korbelak | 350/96.2 |
| 4,793,682 | 12/1988 | Cooper | 385/135 |
| 4,805,979 | 2/1989 | Bossard et al. | 350/96.2 |
| 4,812,004 | 3/1989 | Biederstedt et al. | 385/135 |
| 4,820,007 | 4/1989 | Ross | 350/96.2 |
| 4,846,343 | 7/1989 | Rupert | 206/303 |
| 4,875,952 | 10/1989 | Mullin et al. | 156/48 |
| 4,927,227 | 5/1990 | Bensel | 350/96.2 |
| 5,042,901 | 8/1991 | Merriken et al. | 350/96.2 |
| 5,097,529 | 3/1992 | Cobb et al. | 385/135 |

Primary Examiner—Frank Gonzalez
Attorney, Agent, or Firm—E. W. Somers; D. E. Hayes

[57] ABSTRACT

A closure (20) which may be used temporarily in the restoration of service to an optical fiber cable (50) which has been damaged includes a base (22) and a cover (24) which include mating longitudinal edge portions. The base and the cover are secured together with longitudinally extending C-clamps (97—97) which are moved slidably to engage the mating longitudinal edge portions of the base and the cover. Cables to be spliced enter the closure through openings in compliant end blocks (67—67). Modules (40,40) are disposed within the closure and hold connective devices used to make connective arrangements between optical fibers of the cables. The closure is easy to assembly is lightweight and may be reused.

17 Claims, 2 Drawing Sheets

OPTICAL FIBER CLOSURE

TECHNICAL FIELD

This invention relates to an optical fiber closure. More particularly, the invention relates to an optical fiber closure which is particularly suited for temporary use to facilitate repairs of optical fiber cables in local area networks trunks, and long haul, for example, for restoring service in damaged runs.

BACKGROUND OF THE INVENTION

The use of communication cables which include a plurality of optical fibers as the transmission media is rapidly expanding. An optical fiber cable may comprise a plurality of glass fibers each of which is protected by at least one layer of a coating material. The optical fibers may be assembled into units in which the fibers are held together by binder ribbons to provide a core. In one manufacturer's line of cables, the core is enclosed by a plastic tube and a plastic jacket.

Whatever the structure of a cable, there must be provisions for connecting, such as by splicing, transmission media at an end of a given length of cable to corresponding transmission media at an adjacent end of another length of cable. It is conventional to use a closure, within which all conductors are connected, wrapped and stored and protected environmentally.

During the connection of metallic conductors, it is customary to bend sharply the conductors, to provide access to other connections. The physical nature of glass optical fibers forecloses the adoption of connectorization techniques which are used with metallic conductors within a closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, expected lives of the fibers will be reduced if bent to less than the minimum bending radius.

In the prior art, fiber slack normally has been provided adjacent to connective arrangements. When splicing optical fibers by mechanical means or by fusion, it becomes necessary to provide enough slack fiber so that the fiber can be pulled out of a closure and positioned in apparatus for the preparation of fiber ends and the joining together of the ends.

In one prior art closure, a tubular cover having a closed end and an open end is adapted to receive and be sealed to a cable termination assembly. The cable termination assembly includes cable entry facilities through which the cables to be spliced are routed. A support member extends from the cable entry facilities and has a free end disposed adjacent to the closed end of the cover. The support member includes a support base for supporting an optical fiber breakout and a plurality of optical fiber splice trays. Mounted centrally of each tray is at least one organizing module each of which is capable of holding a plurality of optical fiber connective arrangements. Each module is such that it is capable of accommodating different kinds of connective arrangements such as, for example, fusion splices and mechanical splices, both polished and non-polished. Each tray is capable of holding a plurality of organizing modules which may be added as needed.

Closures also are needed for uses other than connecting end portions of newly installed cable lengths. During the service life of an optical fiber cable, the cable may become damaged. This may occur, for example, through unintentional contact by various kinds of excavation equipment, by lightning or by repeated attack by animals such as gophers, for example. Such damage may be partial, in which case one or several optical fibers may be interrupted, or the damage may be total, such as a complete cable cut, for example.

Whatever the structure of the damaged cable, there must be provisions for connecting, such as by splicing, transmission media of the cable on each side of the damage location to corresponding transmission media of a restoration cable which is used to bridge around the damage location. It is conventional to use a closure, within which all fibers are connected, wrapped and stored and protected environmentally.

In any case, it becomes necessary to restore service as quickly as possible. This may be done through an expedited temporary arrangement while more work is under way to replace the damaged cable with an equivalent or enhanced system.

A temporary arrangement which includes a closure must be one which is easily and rapidly installed and which is low in cost. Elements of the arrangement must be capable of being packaged in a kit which is portable and, desirably, in one which may be carried by an individual from a vehicle to a field location at which a disruption to service has occurred. Because of the desired portability of the kit, the sought after closure must be light in weight and not be bulky.

The prior art includes at least one relatively small repair closure. See U.S. Pat. No. 4,820,007 which issued on Apr. 11, 1989 in the names of R. R. Ross and I. Vedejs. In it, a splice tray includes provisions on one side for holding optical fiber splices and metallic conductor splices on an opposite side. An electrical bonding and gripping assembly is adapted to be mounted on the splice tray. The closure also includes mating cover portions which are moved into engagement with each other to enclose the tray. Also, a waterblocking encapsulant may be introduced into the closure. See also application Ser. No. 07/736,850 (still pending) filed on Jul. 29, 1991 in the names of W. H. Bensel and G. S. Cobb.

Although the prior art of cable closures is highly developed, available closures have some shortcomings insofar as their temporary use in repair operations. For example, many commercially available closures include redundant sealing systems, provisions for ensuring water tightness, bonding and grounding, encapsulants and somewhat elaborate fastening arrangements for securing together portions of the closures. Also, the times required for the assembly of prior art closures are not insubstantial.

What is sought-after and seemingly what does not appear in the prior art is a closure which is relatively small and which is suitable for restoration installations for partial or total outages. The sought after closure must be relatively inexpensive, reusable, arranged for rapid assembly, not necessarily watertight and, of course, its use must not cause excessive bending to be introduced into the optical fiber.

SUMMARY OF THE INVENTION

The foregoing problems of the prior art have been overcome by an optical fiber closure of this invention.

A closure comprises a longitudinally extending base which includes longitudinally extending free edge portions and a longitudinally extending cover which includes longitudinally extending free edge portions and which is adapted to be assembled to the base. At least one splicing module is supported by the base, each module including a plurality of nests each of which is adapted to hold a connective arrangement for two optical fibers such that radius of curvature of fiber end portions which are spliced is less than a value which causes unacceptable loses to be introduced into the optical fiber. In the preferred embodiment, the longitudinal axes of the fiber end portions which are spliced are parallel to a longitudinal axis of the closure. Compliant means is disposed at each end of the closure and engages inner surfaces of the base and the cover and includes passageways therethrough to allow a cable portion to extend through each passageway into the closure. The closure also includes facilities adapted to mate slidably with associated longitudinally extending side edge portions of the cover and of the base to secure the cover to the base.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
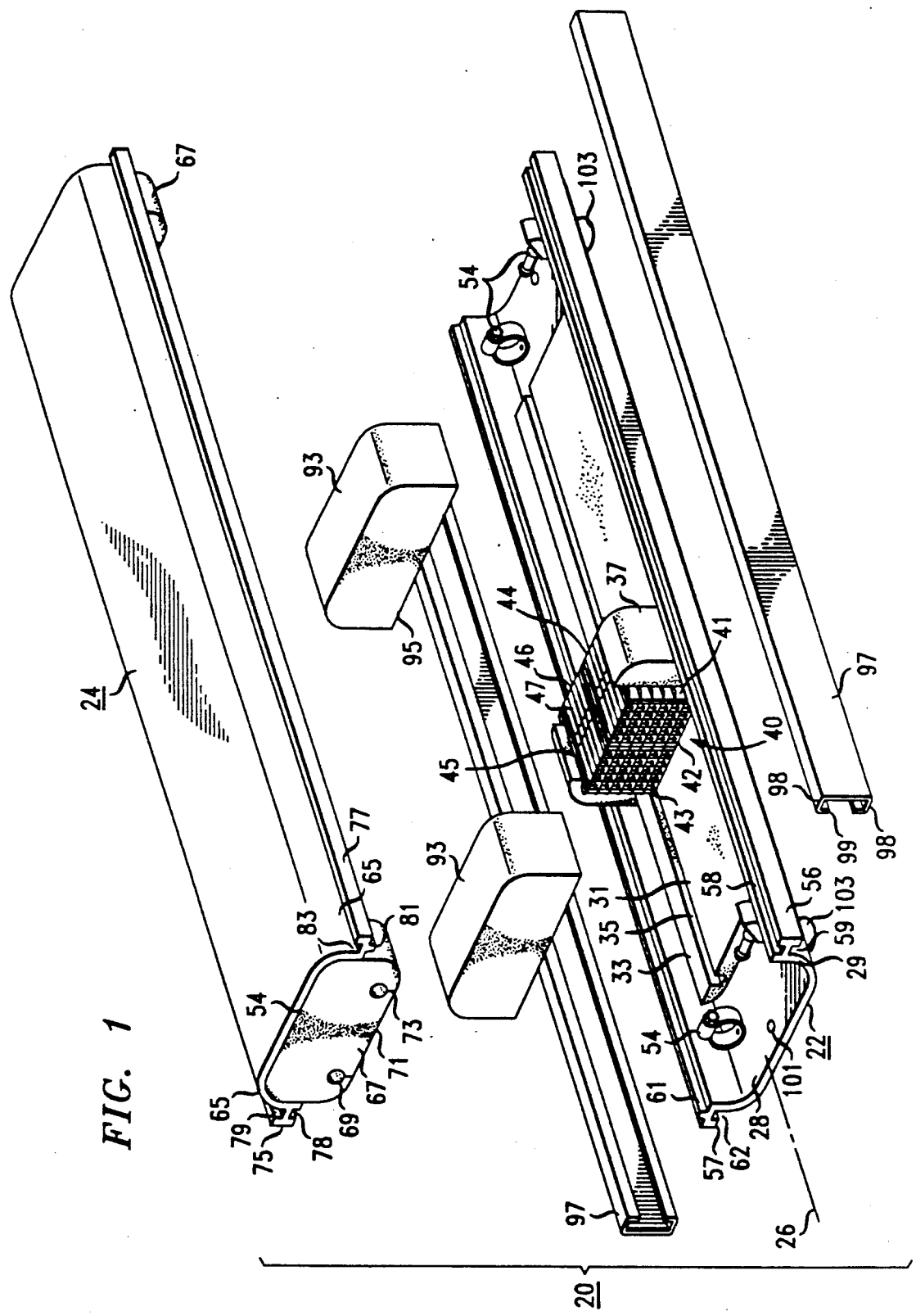
FIG. 1 is an exploded perspective view of a closure of this invention in which splicing of a restoration cable to damaged cable may be accomplished.
Figure 2:
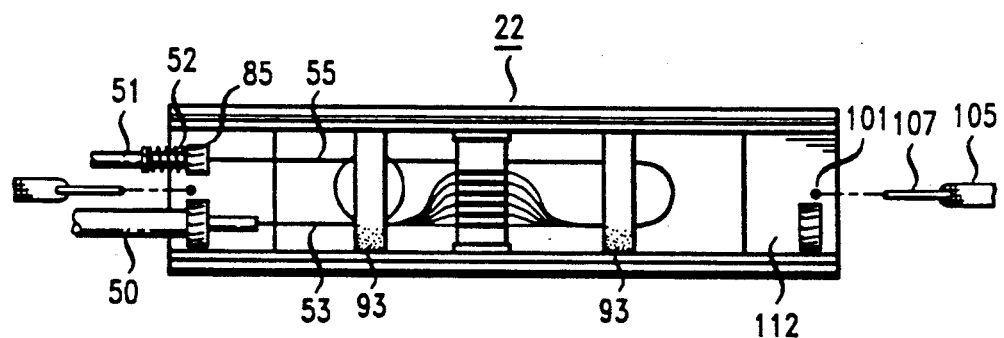
FIG. 2 is a plan view of a base of the closure of FIG. 1.

Referring now to FIGS. 1 and 2, there is shown an optical fiber closure of this invention, the closure being designated generally by the numeral 20. The closure 20 includes a base 22 and a cover 24 and has a longitudinal axis 26.

The base 22 is generally U-shaped and includes an invert portion 28 and side leg portions 29—29. Attached to the invert portion 28 is a pad 31 which includes radiused, longitudinally extending side portions 33—33, the radius of each being such that it is complementary to the radiused intersection of a side leg portion and the invert portion 28. Also, the pad 31 includes two spaced apart, longitudinally extending grooves 35—35. Preferably, the pad 31 is made of a foamed polymeric material.

Mounted to the pad 31 are two pedestals 37—37 each of which preferably is made of a foamed polymeric material. Between the pedestals 37—37 are disposed a plurality of splicing modules 40—40 each adjusted to hold an optical fiber splicing connective arrangement. Such a module 40 is disclosed and claimed in application Ser. No. 07/776,720 (still pending) which was filed on Oct. 15, 1991 in the name of W. W. Jones and which is incorporated by reference hereinto. Typically, twelve modules, each including six nests are disposed between the pedestals. The modules 40—40 of the preferred embodiment are arranged so that the longitudinal axes of the optical fiber connective arrangements held therein are parallel to the longitudinal axis 26 of the closure.

Viewing now FIG. 1, it can be seen that each splicing module 40 includes a holder 41 which includes a base 42 and two sidewalls 43—43. Adapted to become disposed in each holder 41 is an insert 44 which is adapted to store a plurality of optical fiber splices which may be made using any of a plurality of commercially available optical fiber splice arrangements. Each insert is made of a material such as a foamed polymeric material which is compliant about the configuration of the particular connective arrangement which is used.

As can be seen in FIG. 1, the insert 44 includes two sidewalls 45—45 between which are disposed a plurality of partitions 46—46. A nest 47 is formed between each sidewall 45 and the adjacent partition and is formed between adjacent ones of the partitions.

The insert 44 is adapted to accommodate any of a plurality of commerically available splicing arrangements. One popular splicing arrangement is a device which is referred to as a cleave, sleeve, and leave (CSL) splicing device and which is disclosed in commonly assigned, U.S. Pat. No. 5,125,057 in the names of J. Aberson, et al.

An optical fiber cable 50 (see FIG. 2) which includes optical fiber 53 which has been damaged is cut to allow an end portion of that portion of the cable going away from the damage to extend into the closure and have fibers thereof terminated in splicing devices (not shown) which are held in the splicing modules 40—40. The closure 20 is included in a restoration kit which is used to restore service at least on a temporary basis. The restoration kit is described and claimed in commonly assigned, copending application Ser. No. 07/826,703 (still pending) which was filed on Jan. 28, 1992 in the names of J. A. Aberson, Jr., E. Halupke, and W. C. Vicory and which is incorporated by reference hereinto. A restoration cable 51 (see FIG. 2), such as one disclosed and claimed in commonly assigned, copending application Ser. No. 07/826,740 (still pending) which was filed on Jan. 28, 1992 in the names of J. R. Holman, P. A. Moss, and T. D. Mathis and which is incorporated by reference hereinto, includes an end portion 52 which enters the closure and optical fiber 55 thereof spliced to end portions of fibers of the damaged cable.

Also attached to each end of the base 22 are a plurality of ring clamps 54—54. (see FIG. 1). Each cable end portion extends through a ring clamp 54 into an inner portion of the base 22.

Figure 3:
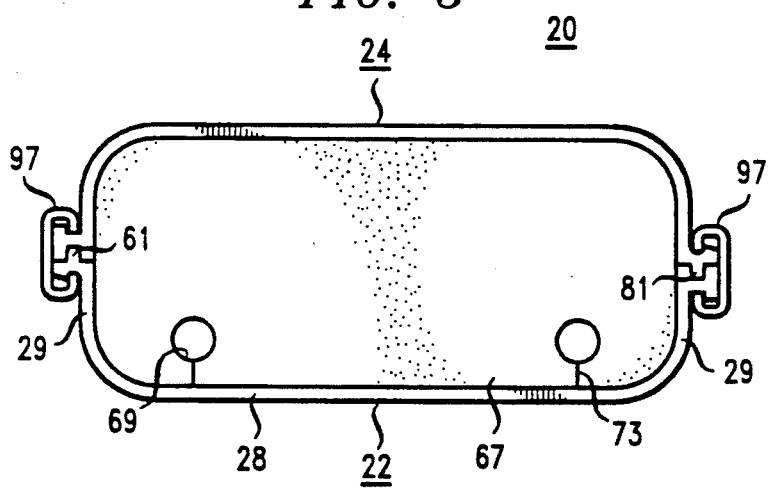
FIG. 3 is an end view of the closure of FIG. 1 showing a cover assembled to the base thereof.

Further as can be seen in FIG. 1 and also in FIG. 3, the side leg portions 29—29 of the base 22 are provided with longitudinally extending side portions 56 and 57. The side portion 56 is H-shaped in cross section with one groove 58 thereof facing toward the cover 24 and one groove 59 thereof facing toward a plane which extends through the invert portion 28. The side portion 57 includes a rib 61 which faces toward the cover 24 and a groove 62 which faces toward the plane of the invert portion 28.

Viewing again FIGS. 1 and 3, it is seen that the cover 24 also is U-shaped, having a center portion 54 and longitudinally extending side portions 65—65. Attached to the cover 24 at each of its ends and disposed between the side portions 65—65 and in engagement with an inner surface of the center portion is an end dam 67. Preferably, the end dam 67 is made of a foamed polymeric material such as a foamed polyurethane ester material and has a plurality of bores 69—69 extending therethrough. When the cover 24 is assembled to the base, a lower portion 71 of each end dam is adapted to be received in engagement with the invert portion 28 and the side leg portions 29—29 of the base. Cables which extend into the closure are received within the bores 69—69 which communicate with an exterior of the end dam through slits 73—73.

The cover 24 includes provisions which are mateable with the longitudinally extending portions 56 and 57 of the base to allow the cover to be assembled to the base. As is seen in FIGS. 1 and 3, one of the side portions 65—65 of the cover is provided with a longitudinally extending interlocking portion 75 whereas the other side portion 65 is provided with an interlocking portion 77. The interlocking portion 75 is H-shaped in transverse cross section and includes two grooves, one designated 78 which faces the base 22 and the other designated 79. The other interlocking portion 77 includes a rib 81 which faces the base 22 and an opposite groove 83.

In using the closure, a craftsperson extends an end portion of a cable 50 (see FIG. 2) which has been damaged, for example, through one of the ring-clamps 54 and removes sheathing elements from the end portion to expose the optical fibers.

An end portion 52 of a cable such as the restoration cable 51 which may be used to bridge temporarily around a damage location has been extended in the factory through another ring clamp 54. Sheath elements of the restoration cable 51 are removed in the factory to expose optical fiber of the restoration cable.

Figure 4:
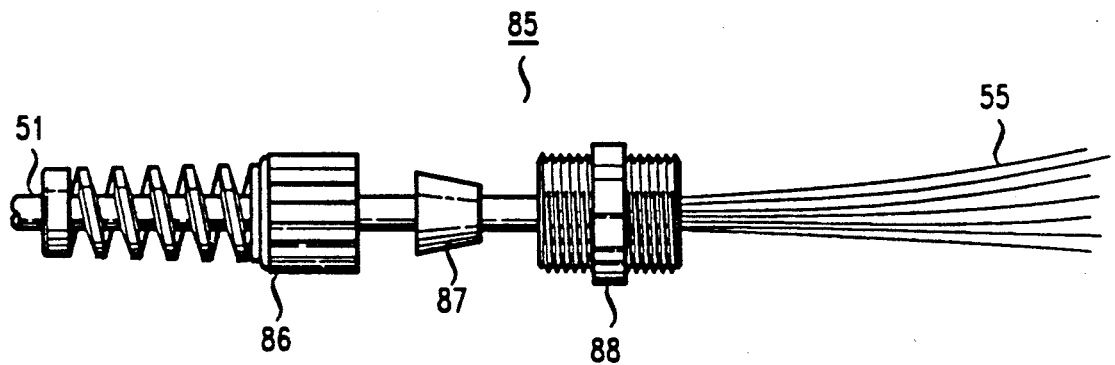
FIG. 4 is an exploded detail view of a strain relief assembly which is assembled to an end portion of the restoration cable.

It should be observed from FIGS. 1 and 2 that an end portion of the restoration cable 51 is provided with a strain relief assembly 85. The strain relief assembly 85 is commercially available and may be one which includes a flexible portion 86 (see FIG. 4), a bushing 87 and a threaded connector 88.

The end portion of the restoration cable 51 extends through the flexible portion, the bushing 87 and the threadable connector 88. With the portions of the strain relief assembly 85 dissembled, sheath elements of the cable 51 are removed to provide exposed lengths of fibers to extend beyond the strain relief assembly to the splicing modules. Then the bushing 87 is inserted into the flexible portion 86 of the strain relief assembly over the end portion 86 of the jacketed restoration cable 51 and the connector 88 turned threadably into an internally threaded end portion of the flexible portion. This causes the strain relief assembly 85 to be secured to the jacketed end portion.

Afterwards, in the factory, the strain relief assembly is inserted into a ring clamp 54 until an exposed portion of the connector 88 is aligned with the ring clamp which is secured to the base 22. Then the ring clamp is tightened about the connector portion 88 to secure the strain relief assembly to the base 22. Advantageously, the strain relief assembly 85 is effective to prevent damage to the portion of the cable which engages an edge of the invert portion of the end portion of the base 22.

Fibers of the end portion of the restoration cable are terminated selectively by the user in splicing devices such as those disclosed and claimed in previously mentioned U.S. Pat. No. 5,125,057 which are then disposed in nests in a splicing module Next, optical fibers of the damaged cable are spliced to appropriate fibers of the restoration cable by using the splicing devices. Afterwards, each splicing device again is caused to become disposed in a nest 47 of a module.

Then the craftsperson positions two blocks 93—93 each of which preferably is made of a foamed polymeric material so that each is positioned adjacent to an end of the closure 20. The fibers extending from the restoration cable and from the damaged cable 50 are caused to become disposed within the grooves 35—35 between a lower portion 95 of a block 93 and the pad 31. The radius of curvature of the optical fibers in the closure 20 including fiber disposed in slack loops exceeds the minimum acceptable value.

The cover 24 is manipulated to cause the rib 81 of the cover to become disposed in the groove 58 of the side portion 56 of the base and to cause the rib 61 of the side portion of the base to become disposed in the groove 78 of the cover. Then a clamping strip 97 having a C-shaped cross section with two hook-like portions 98—98 is moved slidably over each of the mated side portions. The movement is accomplished so as to cause an end 99 of one portion 98 to become disposed in the groove 79 of the cover and the other end 99 to become disposed in the groove 62 of the side portion 48 of the base. Another clamping strip 97 is moved slidably over mating side portions in an opposite side of the closure to cause an end 99 of the strip to be received in the groove 83 of the cover and the other end 99 to become received in the groove 59 of the side portion 56. The clamping strips 97—97 are configured so that the hook-like portions of each must be moved apart to engage the grooves of the side portions of the cover and of the base. When released, and when in place, the clamps 97—97 apply forces to the cover and the base to hold them secured together.

An additional feature of the closure 20 is a system which is adapted to hold the closure stabilized in the field while splicing operations are performed. To this end, the base 22 of the closure includes an opening 101 formed adjacent to each end thereof. Also, the base 22 is provided with feet 103—103, two projecting outwardly from the invert portion 28 of each end. Preferably the feet 103-103 are made of a rubber material. During splicing, the closure 20, which may be transported in a carrying case of the aforementioned restoration kit (not shown), may be secured to the carrying case with an elastic cord 105 (see FIG. 2) having a hook 107 at each end. One hook 107 is looped through the opening 101 at one end of the base, the cord routed along one side of the carrying case of the restoration kit opposite to that engaged by the feet and the hook at the other cord end looped through the opening 101 at the other end of the base. The cord 105 holds the base 22 to the case to facilitate splicing. Afterwards, the cord is removed. The feet prevent slippage between the base and the carrying case.

After the cable 50 on one side of the damage location has been spliced to the restoration cable 51, the end of the cable on the other side of the damage location is spliced to the other end of the restoration cable in a second closure which may be identical to the closure 20.

Typically, the portion of a cable which extends between terminals in the field and in which the damage has occurred is replaced with a new length of cable. After this has been accomplished, the closure and restoration cable may be removed and restored in the carrying case for reuse.

Should the cable 50 be damaged only partially, the sheath is removed for a distance equal to the distance between ring clamps 54—54 at opposite ends of the closure 20 at locations on opposite sides of the damage location. Then ring clamps at opposite ends of the base are opened to allow the damaged portion of the cable to extend therethrough. The ring clamps are tightened and the damaged fibers spliced to fiber end portions at one end of the restoration cable 51. Sheath entry is made into the cable 50 at a predetermined distance from the damage point with the exposed portion of the cable positioned in a second closure. The fibers which include the damaged portions now disposed in the second closure are spliced to the other end of the restoration cable.

In the preferred embodiment, the pedestals 37—37 are disposed off-center of the closure (see FIG. 2). This is done in order not to fall below the minimum bend radius of the fiber when the closure is used to restore service in a partial outage situation. In a partial outage, and as mentioned hereinbefore, a cable which includes some damaged fibers is extended through the closure 20. Those optical fibers which have been damaged are cut dead ahead at a location 112, looped on one side of the modules 40—40 and then spliced to optical fibers of the restoration cable 51 which enter the closure on the left and which enter the splicing modules from the right-hand side as viewed in FIG. 2. Optical fibers which have not been damaged extend along a groove 35 between sheathed ends of the damaged cable within the closure 20.

It is to be understood that the above-described arrangements are simply illustrative of the invention. Other arrangements may be devised by those skilled in the art which will embody the principles of the invention and fall within the spirit and scope thereof.

We claim:

1. A closure, which comprises
   a longitudinally extending base which includes longitudinally extending free edge portions;
   a longitudinally extending cover which includes longitudinally extending free edge portions each associated with a longitudinally extending free edge portion of said base and which is adapted to be assembled to said base;
   at least one splicing module which is supported by said base, each module including a plurality of nests each of which is adapted to hold a connective arrangement for optical fibers such that the radius of curvature of fiber end portions which are spliced is less than a value which introduces unacceptable losses into the optical fiber;
   compliant means disposed at each end of said closure and engaging inner surfaces of said base and said cover and including passageways therethrough to allow a cable to extend through each passageway into said closure; and
   means adapted to become slidably engaged with associated longitudinally extending side edge portions of said cover and of said base for securing said cover to said base.

2. The closure of claim 1, wherein said base is U-shaped with longitudinally extending free edge portions and wherein longitudinal axes of fiber end portions in said module are parallel to a longitudinal axis of said closure.

3. The closure of claim 2, wherein one of said longitudinally extending free edge portions of said base includes a rib and an opposed groove and the other longitudinally extending free edge portion includes opposed grooves.

4. The closure of claim 1, which also includes a pad which is made of a foamed polymeric material and which is supported on an invert portion of said base, said splicing module being mounted on said pad.

5. The closure of claim 4, which also includes two spaced blocks of foamed polymeric material supported by said pad, each block being disposed between said module and compliant means at an end of said closure.

6. The closure of claim 4, wherein said pad includes two longitudinally extending grooves.

7. The closure of claim 1, which also includes clamping means at each end of said base for securing to the base end portions of cables which extend into said closure.

8. The closure of claim 7, wherein a cable which extends into said closure is provided with a strain relief assembly and wherein said strain relief assembly extends through and is secured to a clamping means.

9. The closure of claim 1, wherein said compliant means includes a block of a foamed polymeric material.

10. The closure of claim 9, wherein said cover is U-shaped and includes longitudinally extending free edge portions.

11. The closure of claim 10, wherein one of said longitudinally extending free edge portions of said cover includes a rib and an opposed groove and the other includes opposed grooves such that the rib of the one edge portion of the base is received in one of the opposed grooves of the other edge portion of the cover and the rib of the one edge portion of the cover is received in one of the opposed grooves of the other edge portion of the base when the cover is assembled to the base.

12. The closure of claim 11, which also includes two clamping strips each having a C-shaped transverse cross section with free edge portions of each strip adapted to be received in grooves of mating longitudinal edge potions of said cover and said base.

13. The closure of claim 1, wherein each said module includes a holder and an insert which is mounted in said holder, said insert including sidewalls and a plurality of partitions with nests being formed between sidewalls and partitions and between sidewalls with each nest adapted to accommodate an optical fiber connective arrangement.

14. The closure of claim 1, wherein said base is provided with an opening in an invert thereof adjacent to each end of said base.

15. The closure of claim 14, which also includes a stabilizing cord assembly, said stabilizing cord assembly including a retractile cord having each end terminated with a hook, each said hook adapted to have a portion thereof inserted into one of said openings in said base to secure said cord assembly to said base.

16. The closure of claim 15, wherein an outer surface of said base is provided with means having a relatively high coefficient of friction to engage a surface and prevent relative movement between said surface and said base.

17. The closure of claim 1, wherein said compliant means at each end of said cover includes two spaced slits, each slit being associated with one of said passageways and communicating its associated passageway with an exterior of said compliant means to facilitate movement of a potion of a cable transversely through a slit and into the associated passageway.

* * * * *